United States Patent
Dulaney et al.

[11] Patent Number: 6,057,003
[45] Date of Patent: May 2, 2000

[54] PEENING PROCESS WITH REDUCTION OF DIELECTRIC BREAKDOWN TO INCREASE PEAK PRESSURE PULSE

[75] Inventors: Jeff L. Dulaney, Dublin; Allan H. Clauer, Worthington; David W. Sokol, Dublin, all of Ohio

[73] Assignee: LSP Technologies, Inc., Dublin, Ohio

[21] Appl. No.: 08/874,174

[22] Filed: Jun. 13, 1997

Related U.S. Application Data

[63] Continuation-in-part of application No. 08/547,012, Oct. 23, 1995, Pat. No. 5,741,559.

[51] Int. Cl.$^7$ ..................................................... B01J 19/08
[52] U.S. Cl. ........................... 427/457; 427/331; 427/402; 427/430.1; 427/554
[58] Field of Search ..................................... 427/554, 331, 427/430.1, 402, 457

[56] References Cited

PUBLICATIONS

Generation of shock waves by laser–induced plasma in confined geometry. Dr. Devaux, et al., Aug. 15, 1993, pp. 2268–2273.
Generations of shock waves by laser–matter interaction in confined geometry. D. Devaux, et al., Dec. 1, 1991, pp. 179–182.
Laser shock processing of aluminum alloys. P. Peyer, et al., Oct. 31, 1995, pp. 102–113.
American Institute of Physics, L. Berthe et ala. Sep. 15, 1997 pp. 2826–2832.
Jun. 11, 1993, David Devaux pp. 99, 140, and 152.
Catherine DuBouchet p. 62.
École Nationale Supérieure d'Arts et Métiers Centre d'Aix–en–Provence M. Cambarnous, et al., Dec. 1, 1994 p. 56.
Creation De Contraintes Residuelles Dans un Supeeralliage a Base de Nickel Par Choc Laser, Pierre Forget, Dec. 1, 1993, pp. 2–4–2–5.

*Primary Examiner*—Bernard Pianalto
*Attorney, Agent, or Firm*—Randall J. Knuth

[57] ABSTRACT

The present invention provides a method of laser shock processing that can be used in a production environment that increases the peak pressure of the shock wave applied to the workpiece that increases residual compresses stresses therein. Such improvement is created by a reduction of dielectric breakdown of the transparent overlay layer utilized.

The method includes the steps of applying a transparent overlay such as water over the workpiece and reducing or limiting the thickness of the transparent overlay material. An alternate embodiment of the invention to reduce dielectric breakdown incorporates the use of a changing or circularly polarized laser beam as opposed to a linearly polarized laser beam.

9 Claims, 6 Drawing Sheets

PEENING PROCESS WITH REDUCTION OF DIELECTRIC BREAKDOWN TO INCREASE PEAK PRESSURE PULSE

CROSS REFERENCE TO RELATED APPLICATIONS

This is a continuation-in-part of U.S. patent application Ser. No. 08/547,012 filed Oct. 23, 1995, U.S. Pat. No. 5,741,559.

BACKGROUND OF THE INVENTION

1. Field of the Invention

The present invention relates to the use of coherent energy pulses, as from high power pulsed lasers, in the shock processing of solid materials, and, more particularly, to methods and apparatus for reducing dielectric breakdown during operation. The invention is especially useful for enhancing or creating desired physical properties such as hardness, strength, and fatigue strength.

2. Description of the Related Art

Known methods for the shock processing of solid materials typically involve the use of high explosive materials in contact with the workpiece. High explosive materials or high pressure gases are used to accelerate a plate that strikes the solid to produce shock waves therein. Shot peening is another widely known and accepted process for improving the fatigue, hardness, and corrosion resistance properties of materials by impact treatment of their surfaces.

Shock processing with coherent radiation has several advantages over what has been done before. For example, the source of the radiation is highly controllable and reproducible. The radiation is easily focused on preselected surface areas and the operating mode is easily changed. This allows flexibility in the desired shocking pressure and careful control over the workpiece area to be shocked. Workpieces immersed in hostile environments, such as high temperature and high vacuum can be shock processed. Additionally, it is easy to shock the workpiece repetitively.

Laser peening (sometimes referred to as laser shock processing) utilizes two overlays; a transparent overlay (usually water) and an opaque overlay (usually an oil-based or acrylic-based black paint). During processing, a laser beam is directed to pass through the water overlay and is absorbed by the opaque overlay, causing a rapid vaporization of the this overlay and the generation of a high-amplitude shock wave. The shock wave cold-works the surface of the part and creates compressive residual stresses, which provide an increase in fatigue properties of the part. A workpiece is typically processed by processing a matrix of overlapping spots that cover the fatigue critical zone of the part.

A problem, in utilizing transparent overlays, is that dielectric breakdown of the overlay may occur during use. The term dielectric breakdown, as used in this application, is the laser-induced ionization of a transparent overlay and subsequent formation of a plasma. It occurs during laser peening, when the laser intensity incident on the transparent overlay causes ionization of the transparent overlay which subsequently produces an avalanche of free electrons. As a result, a plasma forms that absorbs incoming laser light, and thereby reduces the amount of laser energy that can reach the opaque overlay. This significantly reduces the peak pressure and duration of the shock wave incident on the workpiece that is being processed.

In the case of a linear polarized laser field, experimental data show that the dielectric breakdown is a probabilistic event that depends on the rms laser field, E, through the simple relation $P=\exp(-K/E)$, where K is a proportionality constant.

The net result of the dielectric breakdown is that the laser energy is not efficiently coupled into the sample surface of the workpiece. Dielectric breakdown may occur in localized sites within the dielectric material (transparent overlay), resulting in a number of small ionized spots that are randomly scattered throughout the overlay. At these spots, a localized plasma forms which absorbs energy from the process area.

What is needed in the art is a laser shock process that is highly repeatable without irregularities and reduction in the applied pressure.

SUMMARY OF THE INVENTION

The present invention provides a method of laser shock processing that can be used in a production environment that significantly increases the peak pressure of the shock wave applied to the workpiece. The method includes the steps of applying a transparent overlay such as water over the workpiece and reducing or limiting the thickness of the transparent overlay material. An alternate embodiment of the invention to reduce dielectric breakdown incorporates the use of a circularly polarized, elliptical polarized, varying polarized laser beam or mixtures thereof, as opposed to a linearly polarized laser beam.

The invention comprises, in one form thereof, a method of improving properties of a solid material by providing shock waves therein, including the steps of applying a transparent overlay material to the solid material; controlling the thickness of said overlay, and directing a pulse of coherent energy to the solid material through the transparent overlay material to create a shock wave.

The invention comprises, in another form thereof, a method of improving properties of a solid material by providing shock waves therein, including the steps of applying a transparent overlay material to the solid material; providing a pulse of coherent energy with constantly changing polarization; and directing the pulse of coherent energy to the solid material through the transparent overlay material to create a shock wave.

The invention comprises, in yet another form thereof, an apparatus for improving properties of a workpiece by providing shock waves therein. The apparatus includes a transparent overlay applicator for applying a transparent overlay to the workpiece. The applicator can develop and maintain an overlay layer of approximately between 0.01 mm to 3.0 mm thick. A high intensity laser is operatively associated with said transparent overlay applicator to provide a laser beam through the liquid transparent overlay to create a shock wave on the workpiece.

An advantage of the present invention is that the method allows an even penetration of the laser beam through the transparent overlay.

Yet another advantage of the present invention is that by reducing the probability of dielectric breakdown in the transparent overlay, a more uniformly shocked piece results.

A further advantage of the present invention is the utilization of a flowing, transparent liquid overlay which permits a thinner overlay to be created on the workpiece.

Yet a further advantage of the present invention is that greater laser energies can be applied more efficiently to the opaque overlay. This will result in higher shock pressures and greater working of the workpiece.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate one preferred embodiment of the invention, in one form, and such exemplifications are not to be construed as limiting the scope of the invention in any manner.

DETAILED DESCRIPTION OF THE INVENTION

The improvements in fatigue life produced by laser shock processing are the results of residual compressive stresses developed in the irradiated surface retarding fatigue crack initiation and/or slowing the crack propagation rate. A crack front is the leading edge of a crack as it propagates through a solid material. Changes in the shape of a crack front and slowing of the crack growth rate when the crack front encounters the laser shocked zone in a laser shock processing condition have been shown. Laser shock processing is an effective method of increasing fatigue life in metals by treating fatigue critical regions. The greater and deeper the residual stresses are created in the workpiece, the greater the effect.

For a more thorough background in the prior history of laser shock processing and that of high power processing of engineered materials, reference can be made to U.S. Pat. No. 5,131,957, such patent explicitly hereby incorporated by reference. This patent also shows a type of laser and laser configuration adaptable for use with the present invention.

Another type of laser adaptable for use with the present invention is that of a Nd-Glass Laser manufactured by LSP Technologies of Dublin, Ohio.

Overlays are applied to the surface of the target workpiece being laser shock processed. These overlay materials may be of two types, one transparent to laser radiation and the other opaque to laser radiation. They may be used either alone or in combination with each other, but it is preferred that they be used in combination with the opaque overlay adjacent to the workpiece, and the outer transparent overlay being adjacent to the opaque overlay.

Where used, the opaque overlay material may be strongly absorbing to the radiation. Useful opaque overlay materials include black paint, pentaerythritol tetranitrate (PETN); bismuth, aluminum, iron, lead, cadmium, tin, zinc, graphite; and mixtures of charcoal or carbon black with various transparent materials such as mixtures of nitrocellulose and potassium perchlorate or potassium nitrate. Optionally, a layer of another solid overlay material may be attached to the layer of substantially opaque material.

The transparent overlay material should be substantially non-absorbing and/or transparent to the radiation. Useful transparent overlay materials include water, water-based solutions, other noncorrosive liquids, glass, quartz, sodium silicate, fused silica, potassium chloride, sodium chloride, polyethylene, fluoroplastics, nitrocellulose, and mixtures thereof. Fluoroplastics, as they are known by ASTM nomenclature, are parallinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (PTFE); fluorinated ethylenepropylene (FEP): the chlorotrifluorethylenes (CTFE); and polyvinylidine fluoride ($PVF_2$). Also available is a variety of copolymers of both halogenated and fluorinated hydrocarbons, including fluorinated elastomers. Further, mineral oils or other hydrocarbon based fluids may be utilized. Additionally, the transparent overlay could be a gel comprised of one or more of the above materials or others.

The term "transparent" in this application is defined as meaning non-absorbing or pervious to the laser beam utilized, not automatically or necessarily non-absorbing to visible light. The transparent overlay material should be substantially transparent to the radiation as discussed above, water being the preferred overlay material.

One physical interpretation of the dielectric breakdown effect for a linearly polarized laser beam is known as the "lucky electron" model. Here "lucky electrons" are those that undergo favorable elastic collisions that reverse their momentums when the laser field reverses. This allows the electrons to gain energy from the alternating light field. When the collision rate is slower than the frequency of the laser light, then the probability of ionization is low. On the other hand, if it is greater than the light frequency, the probability of ionization increases.

Figure 1A:
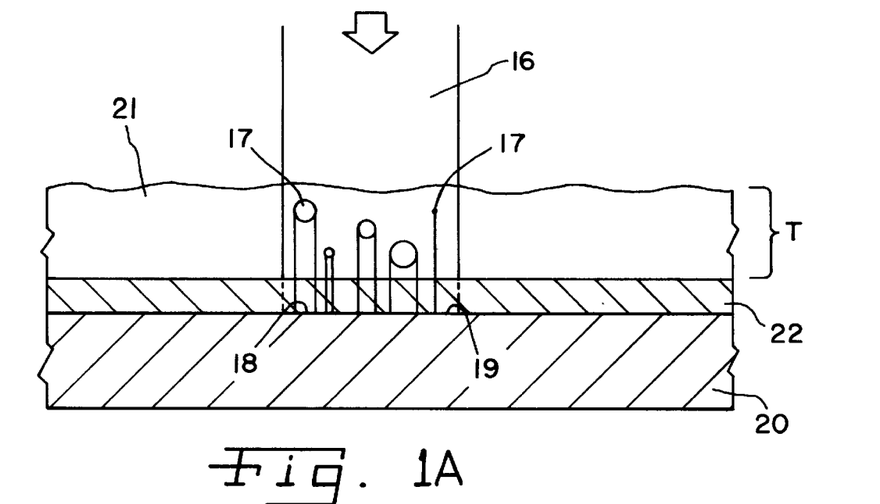
FIG. 1A is an enlarged side view of a workpiece being processed in the laser peening process of the present invention, showing in an exaggerated view a number of dielectric breakdowns occurring in the transparent overlay. The dielectric breakdowns are shown casting exaggerated shadows upon the opaque overlay and workpiece.
Figure 1B:
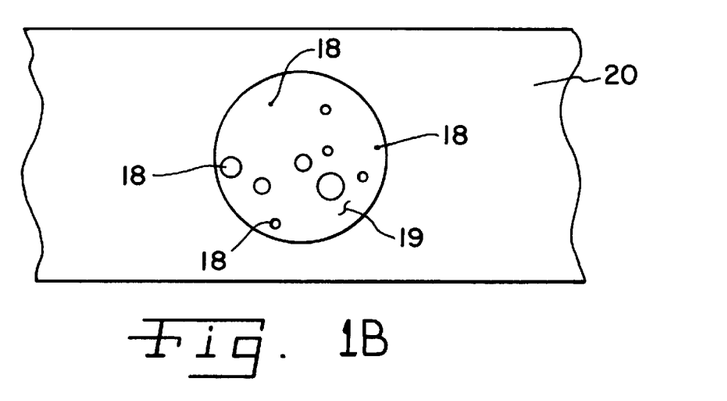
FIG. 1B is a plan view of the processed section of the workpiece of FIG. 1A, showing the processed area along with unprocessed areas caused by dielectric breakdowns.

FIG. 1A illustrates the current problem. In this description, workpiece 20 has a first opaque layer 22 with a layer of transparent overlay material 21 covering a portion thereof. Dielectric breakdown events 17 occur in laser beam path 16 and reduce the laser beam intensity directly under the breakdown by refracting, reflecting, or absorbing the laser beam (reference arrows 15) out of the area in which the laser beam would normally impact. Such action results in under-processed or unprocessed areas IS on the surface of workpiece 20 within processed area 19 (FIGS. 1A and 1B).

The present invention controls particular variables during laser shock processing which permit the laser system to create a larger peak pressure, which cold-works the surface of workpiece 20 and directly creates the results and intended effects in the workpiece. This peak pressure is increased when there is a reduction in the amount of dielectric breakdown, thereby permitting larger amounts of laser energy to be applied to opaque layer 22 and workpiece 20.

Prior conventional thicknesses of the transparent overlay are that of between approximately 3.0 mm. to 5 mm. of water. This was utilized in laser shock processing because there is a requirement to apply the developed pressure pulse as long as possible to the workpiece. The laser pulse duration can be measured and the length of time the pressure pulse travels through the transparent overlay can be calculated. Therefore, conventional thinking required that the transparent overlay be thick enough to maintain the pressure pulse against the workpiece much longer than the laser pulse. This necessitated a thick transparent overlay to maintain and cover or "hold" such pressure pulse to the workpiece for as long a time as possible. Such usage was though conventional.

The inventors of present invention have discovered that the time-length of the pressure pulse is not the only limiting factor in laser peening. Their discovery now teaches that applying the highest peak pressure pulse to the workpiece is as significant or more significant than providing that the duration of maintaining the pressure pulse against the workpiece is as long as possible. That is of course providing that the duration of maintaining the pressure against the workpiece surface is at least equal to the length of the laser pulse.

Figure 3A:
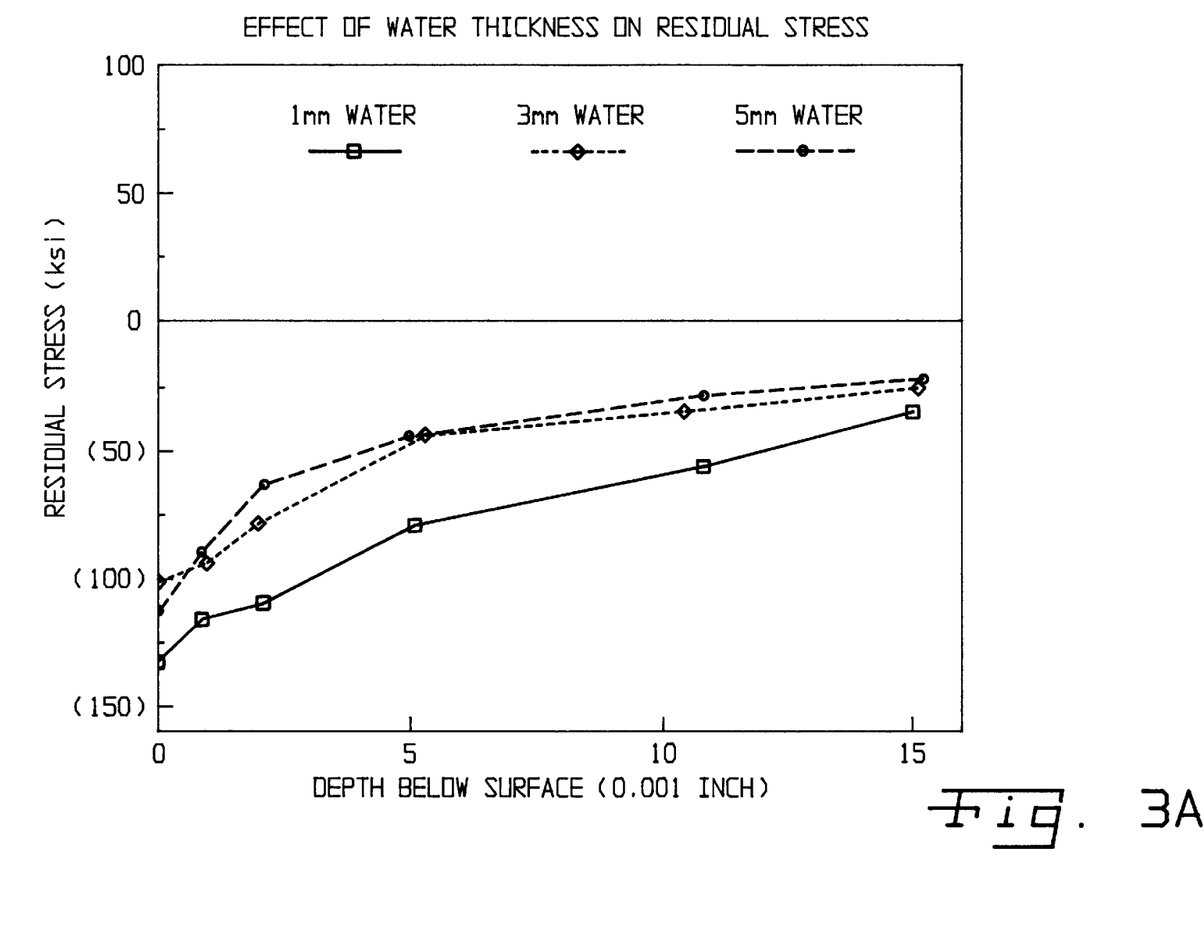
FIG. 3A is a graph of experimental data collected depicting the depth and amount of residual stress created in test workpieces compared to the thickness (T) of the transparent overlay.
Figure 3B:
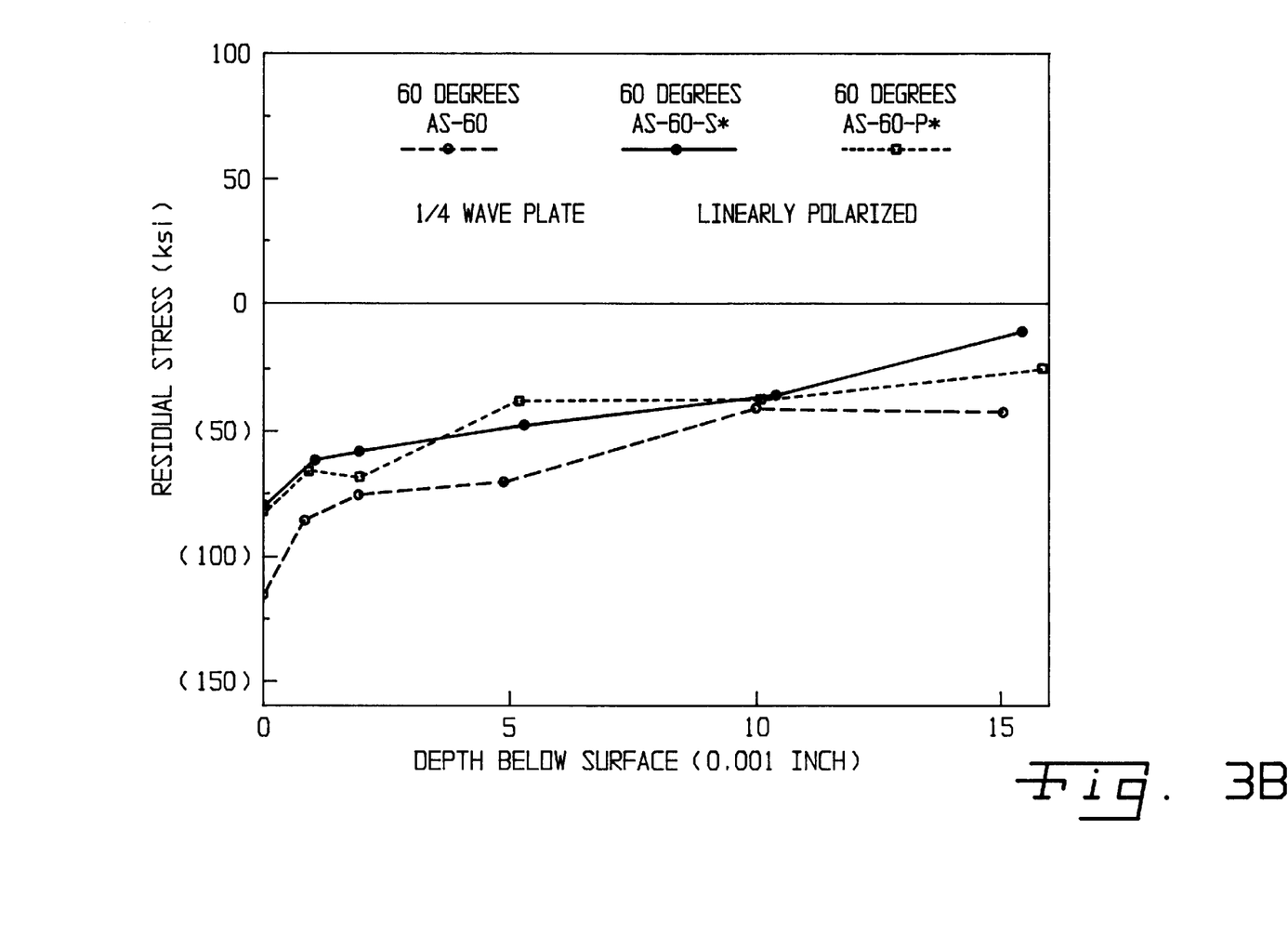
FIG. 3B is a graph of experimental data collected depicting the depth and amount of residual stress created in test workpieces compared to the polarization of the laser beam utilized.

As shown in FIG. 3A, these conventional thicknesses (i.e., 3 mm and 5 mm) of transparent overlay result in peak pressure pulses that created residual compressive stresses depicted via the dotted lines. In one form of the invention, utilizing an unconventional thickness of transparent overlay, the residual compressive stress level within the workpiece was increased at each identified depth level in the workpiece. In the sample shown, an approximately 1.0 mm thickness of the transparent overlay (in this cane water) increased the residual compressive stress level at all depths as shown by the solid line of the graph. It is theorized that reducing the thickness of the transparent overlay reduces the probability of dielectric breakdown thereby permitting more energy to couple to the opaque layer and workpiece. Also, in the system of the present invention, the applied peak pressure created trends upward as laser power density is increased.

Figure 2A:
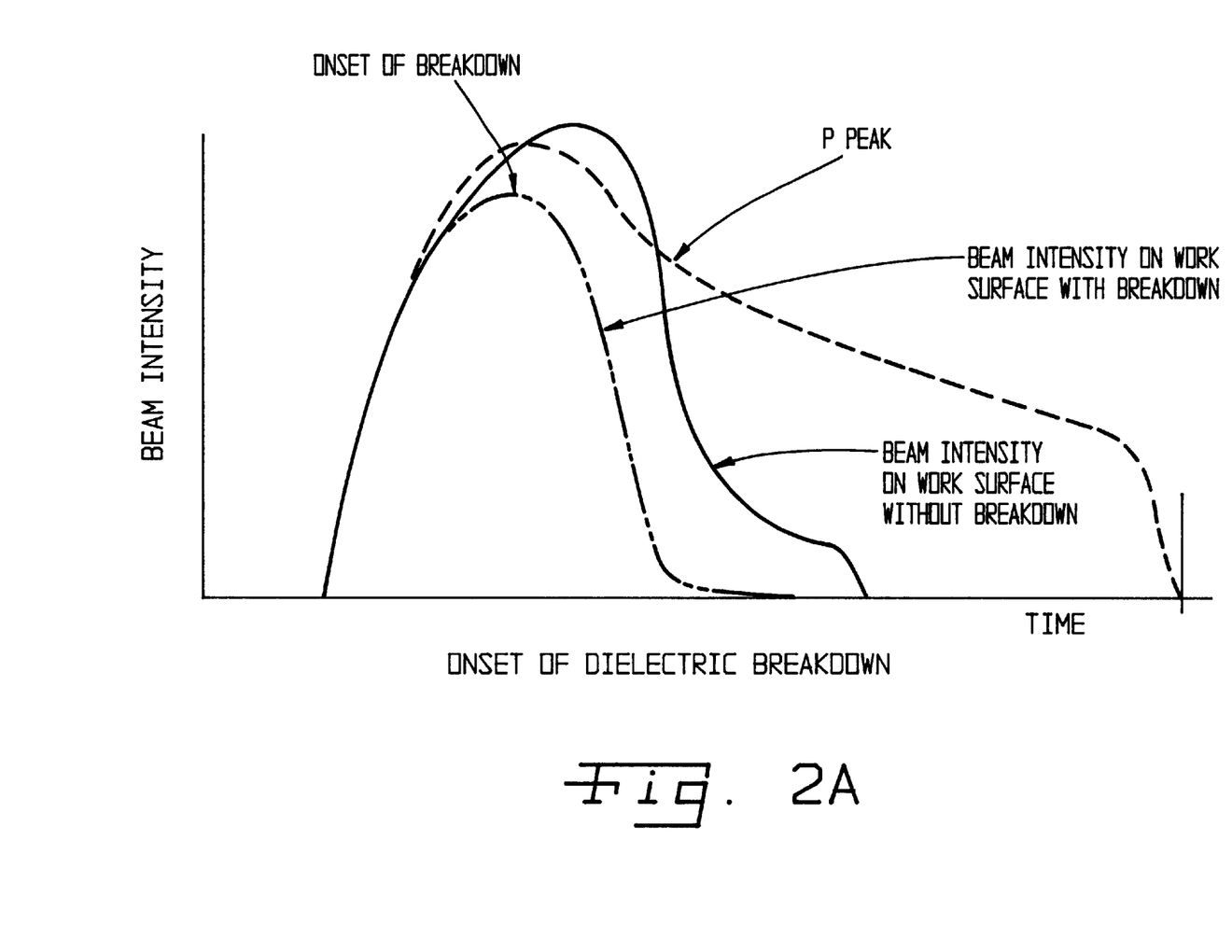
FIG. 2A is a graph showing how the onset of dielectric breakdown can effect the laser beam intensity on the workpiece surface during a laser pulse.
Figure 2B:
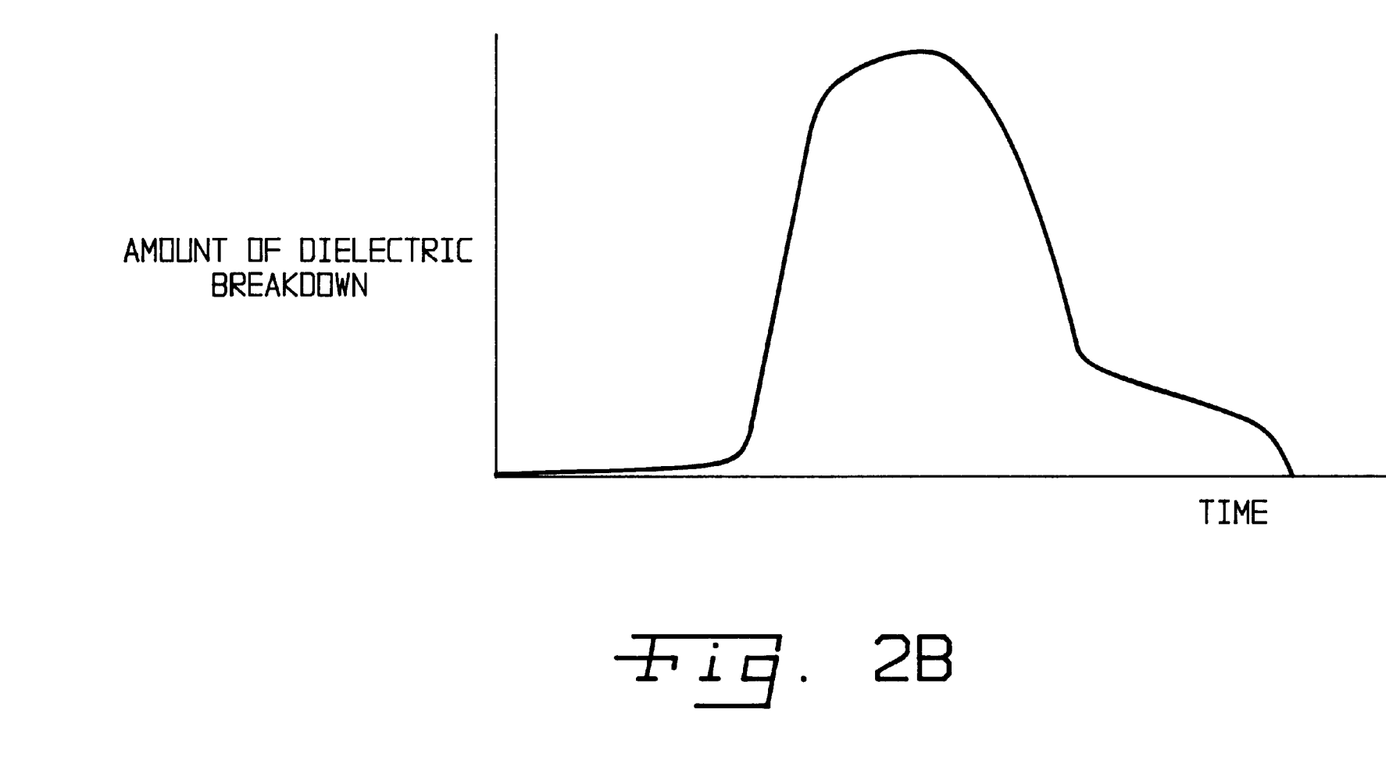
FIG. 2B is a graph of effects of the changed laser pulse on the pressure pulse.

Previous conventional thought on the thickness of the transparent overlay layer was that one needed to have it thicker to keep the pressure waves, as shown in FIG. 2B, controllable at a high pressure level for as long as possible against the surface of the workpiece (workpiece 20). Conventional thought was that by making the transparent overlay thicker it would achieve the highest and longest total pressure.

The present invention utilizes the transparent overlay of approximately 0.01 to 3.0 mm of water. Additionally, by causing the transparent overlay to flow over the workpiece 20, another way to control the overlay thickness has been developed. The overall improvement is that of creating a higher peak pressure pulse and greater residual stress levels by utilizing a thin transparent overlay as opposed to a thick overlay.

It is desirable to have the transparent overlay thickness be as thin as possible to decrease the volume of transparent overlay exposed to the laser beam, and thereby decrease the probability of dielectric breakdown. However, the thickness of the transparent overlay can influence the length of the pressure pulse if the overlay is very thin. That is because the duration of confinement of the plasma by the transparent overlay is sustained only until the shock wave traveling back out through the transparent overlay reaches the outside surface of the overlay. At this point, the transparent overlay is "blown off" and the plasma expands freely away from the target surface, releasing the pressure.

This consideration limits how thin the overlay can be, depending on the minimum length of the pressure pulse desired. If the transparent overlay is very thick, the pressure pulse will naturally decay with increasing time. The pressure increases and is sustained during the time the laser beam is applied. After the laser pulse is turned off, the pressure decays due to cooling of the plasma by thermal conduction into the target surface and by continued adiabatic expansion of the plasma due to the movement of the target and overlay surfaces away from each other under the action of the plasma pressure. At some point, the surface pressure decreases below the dynamic yield strength of the target material and it is no longer effective in imparting plastic strain into the material for further development of residual compressive stress. This point is presumed to be no more than three to five times the length of the laser pulse, but may be less. If the maximum effect of a selected laser pulse was desired, then the transparent overlay thickness should be nominally no less than that given by the simple calculation of: sound speed in the transparent overlay multiplied by three times the laser pulse length. For a water overlay and a laser pulse length of 25 nanoseconds, this calculation would be: $(1.5 \times 10^6 \text{ mm/s}) \times (3 \times 25 \times 10^{-9} \text{ s}) = 0.11$ mm thick water overlay minimum.

However, there are possible advantages in using overlays thinner than that provided by the above calculation. Thinner overlays will further reduce the probability of dielectric breakdown and will also act to limit the length of the pressure pulse, even if the laser pulse length is longer. In this case, the transparent overlay can be made as thin as required to reach the length of pressure pulse desired. For example, if a 25 nanosecond laser pulse is being used, but a 10 nanosecond pressure pulse is wanted, and the speed of sound in the transparent overlay material is $2 \times 10^6$ mm/s, then the thickness of the transparent overlay would be: $(2 \times 10^6 \text{ mm/s}) \times (10 \times 10^{-9} \text{ s}) = 0.02$ mm.

Controlling the thickness (T) of the transparent overlay is accomplished in a number of ways. Accurate control and placement of workpiece 20 within a pool of transparent overlay would control the effective thickness (T) of the overlay relative to laser beam 16. Control of fluid injectors or valves bringing liquid transparent overlay material to workpiece 20 within the processing chamber (not shown) would also permit control of overlay thickness. One other way to control the thickness (T) of transparent overlay would be to add controlled quantities of surfactants, liquefiers, or transport agents so for a known amount of transparent overlay on a part, the overlay characteristics of surface tension and other physical parameters may be controlled to ensure accurate control of overlay thickness. Other embodiments of control of transparent overlay thickness may comprise transparent paint or transparent tape.

The transparent overlays to minimize dielectric breakdown and control the length of the laser beam might also be accomplished using transparent tape of solid polymeric or mineral materials with or without an adhesive backing.

Another way to control the thickness of transparent overlay 21 would be to constantly flow such overlay material over the target area on workpiece 20. Such action would reduce surface tension effects (for liquids). Controlled application of the volume and velocity of the applied transparent overlay material via valves, injectors, solenoids, etc., would permit control and of the operational thickness (T) of transparent overlay.

Figure 4:
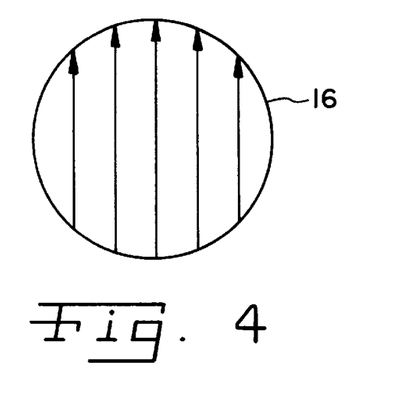
FIG. 4 is a diagrammatical view of the polarization of a laser beam.

Another embodiment of the invention, to control dielectric breakdown, is that of controlling the polarization of the laser light. FIG. 4 shows a diagrammatic representation of the polarization of a cross-section of a typical laser beam. The present invention creates a means and device to cause the polarization of the beam to change or vary, and in a preferred embodiment to rotate. Since the dielectric breakdown of the material is a probabilistic effect, the inventors have determined it is more probable if one utilizes a linearly polarized beam. If a laser beam with changing, varying, elliptical or circular polarization is used, the probability of such ionization will decrease. As used in this application, for ease of description, elliptical or circular polarization of the laser beam is defined to include the following types of polarization: elliptical, circular, time varying, time changing, and mixtures thereof. Such definition does not include pure linearly polarization of the laser beam. In this case, the electrons (from the lucky electron model) will not only have to reverse their direction after a collision, but also have to change directions to remain in phase with the electric field. Creation of the intentionally circularly or elliptically polarized laser beam thus reduces the probability of the breakdown in the dielectric, as compared to the linearly polarized case. The present embodiment, then changes the way of entering energy into the transparent overlay in such a manner that the overlay cannot capture the energy, and therefor dielectric breakdown is reduced.

Figure 6:
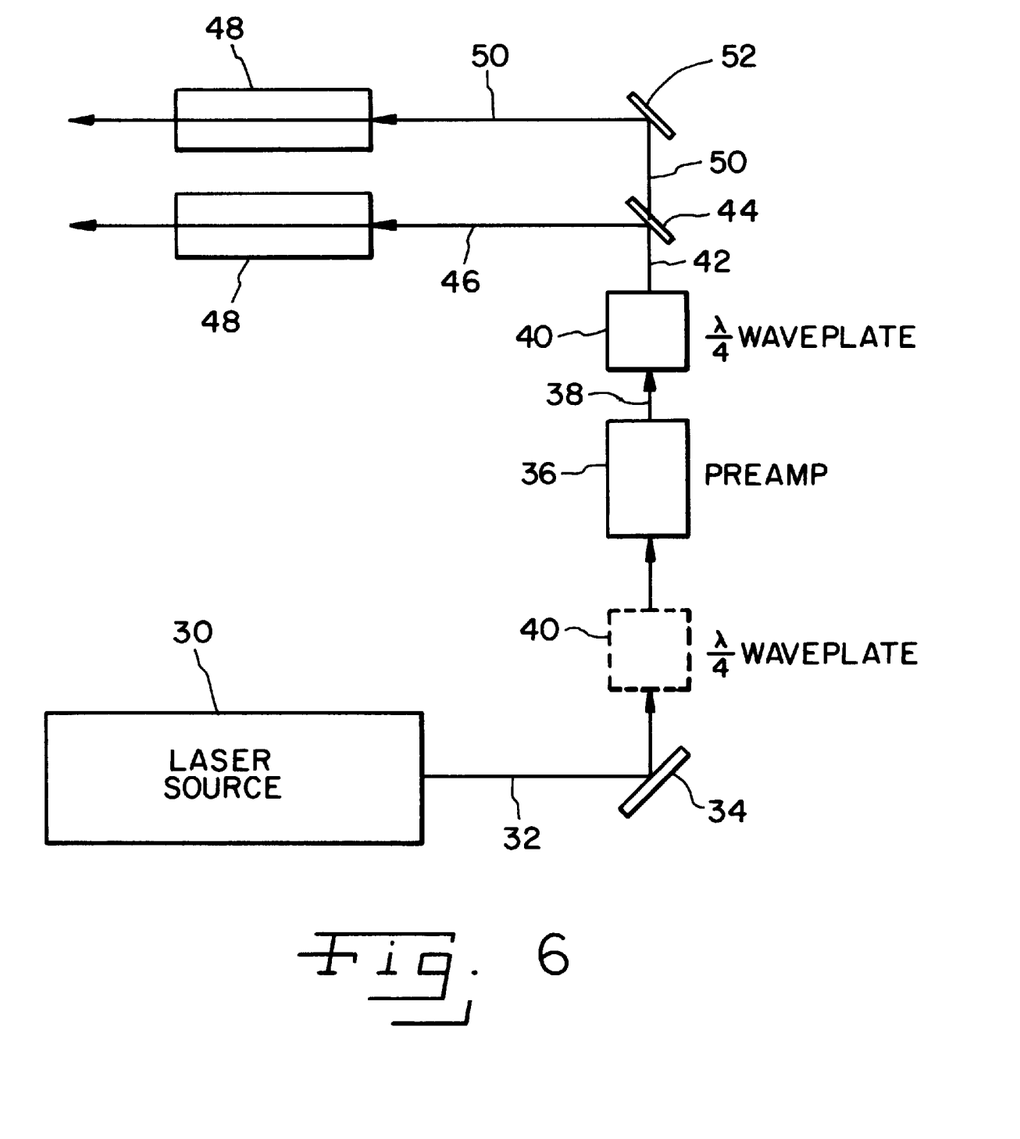
FIG. 6 is a block diagram of the laser processing system of one form of the present invention.

One method of forming a elliptically or circularly polarized laser beam is shown in the depiction of the laser system of FIG. 6. Shown there, a laser source 30 creates a pulsed laser beam 32 which impacts a mirror 34. The laser beam reflects from mirror 34 and travels to a laser pre-amp 36. Pre-amp 36 operates to increase the amplitude of the laser beam previously created. The amplified laser beam 38 emerging from pre-amp 36 enters into a device 40 for changing, in the preferred embodiment of constant rotation, the polarization of the laser beam 38. One form of changing the polarization of laser beam 38 is to utilize a ¼ waveplate as device 40.

Figure 5:
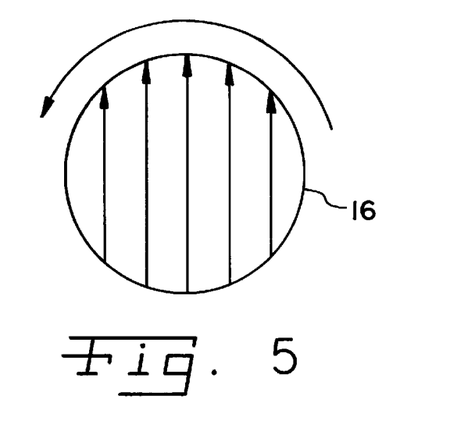
FIG. 5 is a diagrammatic view of the polarization of the laser beam of the present invention, indicating rotation thereof.

It is at this point where the linearly polarized laser beam, as shown in FIG. 4, is changed into a elliptically or circularly rotating laser beam as in FIG. 5. The resultant, elliptically or circularly polarized laser beam 42 passes through and is reflected off of beam splitter 44. The reflected laser beam 46 travels toward one particular laser amplifier 48 while the transmitted laser beam 50 reflects from a second mirror 52 through to another laser amplifier 54. These transmitted and reflected laser beams either or both 46 and 50, of an elliptical or circular polarized nature, are then directed to workpiece 20 as shown in FIG. 1A. Alternatively, device 40 may be placed at different locations along the created laser beam.

In another embodiment of the present invention, both the elliptically or circularly polarized laser energy and reduced thickness transparent overlay material maybe used together to further reduce dielectric breakdown effects.

The above-described process or portions of the process are repeated to shock process the desired surface area of workpiece 20.

Depending upon the workpiece material, a particular parameter space of the present invention may be selected to control the shock process. For example, the operator controller may select a particular laser pulse energy, laser pulse length, number of laser pulses, focal length lens, working distance, thickness of both the energy absorbing coating and transparent overlay to control the laser shock process. More particularly, laser pulse energy and laser pulse width directly affect this process. The amount of energy placed on the surface of the workpiece and number of laser pulses affects the depth of each shock and the speed of the shocking process. It has been found that the energy of the laser pulse, as well as other parameters should be controlled in order to optimize the process and prevent surface melting of the workpiece.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of improving properties of a solid material by providing shock waves therein, comprising:

applying a transparent overlay material to the solid material;

reducing the magnitude of dielectric breakdown in the transparent overlay material; and directing a pulse of coherent energy to the solid material through the transparent overlay material to create a shock wave.

2. The method of claim 1 in which said method is repeated to another portion of the solid material.

3. The method of claim 1 in which said step of reducing the dielectric breakdown comprises repetitively changing the polarization of the pulse of coherent energy.

4. The method of claim 1 in which said step of reducing the dielectric breakdown comprises creating a circular polarized pulse of coherent energy.

5. The method of claim 4 in which said step of creating a circular polarization of the pulse of coherent energy comprises passing the pulse of coherent energy through a ¼ waveplate.

6. The method of claim 1 in which said step of reducing the dielectric breakdown comprises creating a varying polarized pulse of coherent energy.

7. The method of claim 6 in which said step of creating a varying polarization of the pulse of coherent energy comprises passing the pulse of coherent energy through a ¼ waveplate.

8. The method of claim 1 in which said step of reducing the dielectric breakdown comprises creating a pulse of coherent energy of intentionally mixed polarization.

9. The method of claim 8 in which said step of creating a mixed polarization of the pulse of coherent energy comprises passing the pulse of coherent energy through a ¼ waveplate.

\* \* \* \* \*